US012664956B2

(12) United States Patent
Wang et al.

(10) Patent No.: US 12,664,956 B2
(45) **Date of Patent: *Jun. 23, 2026**

(54) HYBRID-DRIVEN CHOLESTERIC LIQUID CRYSTAL DISPLAY

(71) Applicant: Iris Optronics Co., Ltd., Tainan City (TW)

(72) Inventors: Sheng-Yao Wang, Tainan City (TW); Wu-Chang Yang, Tainan City (TW); Cheng-Hung Yao, Tainan City (TW); Chi-Chang Liao, Tainan City (TW)

(73) Assignee: Iris Optronics Co., Ltd., Tainan City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/048,956

(22) Filed: Feb. 9, 2025

(65) Prior Publication Data

US 2025/0182712 A1 Jun. 5, 2025

Related U.S. Application Data

(63) Continuation of application No. 18/197,725, filed on May 16, 2023, now Pat. No. 12,272,329.

(30) Foreign Application Priority Data

May 16, 2022 (TW) ................................ 111118188

(51) Int. Cl.
*G09G 3/36* (2006.01)
*G09G 3/20* (2006.01)

(52) U.S. Cl.
CPC ......... *G09G 3/3629* (2013.01); *G09G 3/2077* (2013.01); *G09G 3/3607* (2013.01); *G09G 2310/08* (2013.01); *G09G 2320/0242* (2013.01)

(58) Field of Classification Search
CPC ....... G09G 2300/0486; G09G 2310/08; G09G 2320/0242; G09G 3/2077; G09G 3/3607; G09G 3/3629; G09G 3/3681; G09G 3/3685; F24F 8/108
See application file for complete search history.

(56) References Cited

U.S. PATENT DOCUMENTS

2005/0001797 A1* 1/2005 Miller .................. G09G 3/3685 345/87
2008/0024412 A1* 1/2008 Nose .................... G09G 3/3629 345/89
2011/0219953 A1* 9/2011 Schreiber ................ F24F 8/108 55/385.2
2012/0050347 A1* 3/2012 Nose .................... G09G 3/3681 345/690

(Continued)

*Primary Examiner* — Richard J Hong

(74) *Attorney, Agent, or Firm* — CKC & Partners Co., LLC

(57) ABSTRACT

The present invention relates to a cholesteric liquid crystal display, a micro processing unit, and a method for hybrid driving. The cholesteric liquid crystal display comprises a display panel and a micro processing unit. First, a grayscale threshold value needs to be set in advance. The micro processing unit will change the grayscale value of the display unit exceeding the grayscale threshold value to the new grayscale value displayed by the bright state color, and display the image by the DDS driving mode. Then the micro processing unit drives the display image in the PWM drive mode, which can greatly improve the color level and contrast display effect of the image.

4 Claims, 8 Drawing Sheets

(56) References Cited

U.S. PATENT DOCUMENTS

| | | | | |
|---|---|---|---|---|
| 2012/0327055 | A1* | 12/2012 | Nose | G09G 3/3629 345/204 |
| 2013/0258220 | A1* | 10/2013 | Uehara | G09G 3/3629 349/33 |

* cited by examiner

HYBRID-DRIVEN CHOLESTERIC LIQUID CRYSTAL DISPLAY

RELATED APPLICATIONS

This application is a Continuation of application Ser. No. 18/197,725, filed on May 16, 2023, which claims priority to Taiwan Application Serial Number 111118188, filed May 16, 2022, all of which are herein incorporated by reference.

BACKGROUND

Technical Field

The present invention relates to a cholesteric liquid crystal display (ChLCD), a micro processing unit, and a method for hybrid driving, and in particular, to a cholesteric liquid crystal display, a microprocessor, and a mixed driving method utilizing DDS (Dynamic Driving Scheme) and PWM (Pulse Width Modulation) driving modes to display images.

Description of Related Art

Cholesteric Liquid Crystal Display (ChLCD) has bistable characteristics and can maintain the displayed content without power consumption. It is often implemented in temperature sensor display, e-book, e-paper, electronic whiteboard and others.

The ChLCD panel is a display area comprising multiple display units that collaborate to show images. To display images, the ChLCD panel can be driven in different modes, including the Dynamic Driving Scheme (DDS) and the Pulse Width Modulation (PWM) driving modes.

The Pulse Width Modulation (PWM) driving mode has some specific features. Although the contrast is not optimal, the color gray scale is relatively better, due to the poor reflection effect of dark-colored displays, which has a general reflectivity of approximately 6%. Moreover, the PWM driving mode provides a relatively high grayscale depth, which can usually be divided into 16 levels. On the other hand, the Dynamic Driving Scheme (DDS) driving mode also has specific features. The contrast is much better compared to the PWM driving mode, but the color gray scale is not optimal. This reflectivity is suppressed to be low when displaying dark colors, which has a general reflectivity of approximately 4.5%. Additionally, the DDS driving mode provides a relatively few grayscale depth, typically divided into 4 to 8 levels.

Referring to FIGS. 1 and 2, FIG. 1 depicts a schematic diagram of a standard display image in the prior art, and FIG. 2 illustrates a display image using the PWM driving mode in the prior art. To display high-quality images with a wide range of colors, the PWM driving mode is commonly used. FIG. 1 shows a standard display image that uses the PWM driving mode, resulting in the display image shown in FIG. 2. While a higher grayscale depth is desirable, the current display image lacks sufficient darkness in the dark color portion, as depicted in the right half of FIG. 2. This results in a deterioration of the contrast, which is a significant disadvantage. Therefore, the screen needs to be improved to achieve a better contrast.

Therefore, the present invention aims to address the issue of inadequate contrast and color gray scale in the display images of the ChLCD. To achieve this, a hybrid-driven ChLCD, a micro processing unit, and a hybrid driving method are provided.

SUMMARY

The present invention provides a hybrid-driven Cholesteric Liquid Crystal Display (ChLCD), a micro processing unit, and a hybrid driving method, using a DDS driving mode and a PWM driving mode to display images on the ChLCD, thereby greatly improving the contrast and color gray scale.

The present invention pertains to a Cholesteric Liquid Crystal Display (ChLCD) that utilizes a hybrid driving method to enhance the display's color gray scale and contrast. The ChLCD comprises a ChLCD panel and a micro processing unit.

The ChLCD panel is composed of a plurality of display units that collaborate to display an image. The image has a preset grayscale depth so that each display unit corresponds to a specific grayscale value. Furthermore, a threshold grayscale value needs to be pre-set within the range of the preset grayscale depth.

The micro processing unit can as also be a timing controller (TCON). The micro processing unit will substitute the grayscale values that are displayed on a plurality of display units and exceed a particular threshold with the grayscale values of bright state colors. Later, the ChLCD panel is driven in the DDS driving mode to display the images, and the micro processing unit drives the ChLCD panel to show the images based on a range of the preset grayscale depth in PWM driving mode. This results in improved color gray scale and contrast of the images on the ChLCD panel.

The ChLCD mentioned above, wherein the preset grayscale depth of the image is a grayscale value ranging from 0 to 255, the threshold grayscale value can be set to 16, and the grayscale value of the bright state color can be set to 240 or higher.

Furthermore, the display units of the images may have three primary colors of Red, Green, and Blue, and the three primary colors of R, G, and B respectively have the aforementioned corresponding grayscale values.

In addition to a ChLCD, the present invention also provides a micro processing unit for hybrid driving the ChLCD. The micro processing unit can be used to enhance the color gray scale and contrast of images on the ChLCD panel. With a preset grayscale depth, each of the display units has a corresponding grayscale value, the micro processing unit comprises a DDS driving module and a PWM driving module.

In a range of the grayscale value of the preset grayscale depth, a threshold grayscale value must be preset in advance. Firstly, if the grayscale values are displayed to the display units and exceed the threshold greyscale value, then the DDS driving module will substitute the grayscale values with the grayscale values of the bright state colors. Next, the multiple display units are driven in a DDS driving mode to display the images.

The DDS driving module substitutes the display units whose grayscale value that are displayed and exceeds the threshold grayscale value of the images with the grayscale values of the bright state colors. Then, the PWM driving module drives the ChLCD panel within the range of preset grayscale depth in the PWM driving mode, resulting in improved color gray scale and contrast of the images. By using both the DDS and PWM driver modules, the overall display effect is enhanced.

Similar to the micro processing unit mentioned earlier, the micro processing unit can also be a timing controller (TCON).

To provide additional clarification, just like the previously mentioned micro processing unit, the preset grayscale depth for an image typically ranges from 0 to 255. The threshold grayscale value can be set to 16 and a grayscale value of the bright state color can be set to 240 or higher.

In addition to the hybrid-driven ChLCD and the micro processing unit, the present invention also provides a hybrid driving method for the ChLCD. The hybrid driving method is used to drive the ChLCD and enhances the color gray scale and contrast of the images on the ChLCD panel. The images will have a preset grayscale depth so that each display unit has a corresponding grayscale value. A threshold grayscale value must be preset in the grayscale depth. The hybrid driving method comprises the following steps:

Firstly, among the grayscale values to be displayed in the images of the plurality of display units, the grayscale values exceeding the threshold grayscale value are substituted with the grayscale values of the bright state colors.

If the grayscale value exceeds the threshold greyscale value, then the DDS driving module will drive the display units in a DDS driving mode to display the images by the grayscale value of the bright state color.

The DDS driving module first sets the grayscale value of the bright state color, which is then followed by the PWM driving module setting the grayscale value within the range of the preset grayscale depth. This drives the ChLCD panel in the PWM driving mode.

Thus, by using both the DDS and PWM driver modules to display the images, it results in improved color gray scale and contrast of the images, and the overall display effect is enhanced.

It is further explained that as in the aforementioned hybrid driving method, wherein the preset grayscale depth of the image is a grayscale value in a range of 0 to 255, the threshold grayscale value can be set to 16, and the grayscale value of the bright state color can be set to 240 or higher.

Besides, the preferred ratio of the driving time between DDS driving mode and PWM driving mode is 1:4, and the resulting display effect of the image is ideal at this ratio.

Therefore, the present invention provides a hybrid-driven cholesteric liquid crystal display, a micro processing unit, and a hybrid driving method, which are components used for displaying images. The micro processing unit such as a timing controller (TCON) is used to drive the ChLCD panel to display images, to preset threshold grayscale value, and to drive the ChLCD panel with DDS Mode and PWM drive mode in succession. After the ChLCD panel is driven in DDS drive mode, display images of the bright state color will be corrected so that the color gray scale and contrast of the images can be greatly improved.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise.

Apparently, descriptions of drawings in the following may be some of embodiments of the present invention, those of ordinary skill in the art may derive other drawings based on the following drawings without unduly experiments.

DETAILED DESCRIPTION

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

Figure 3:
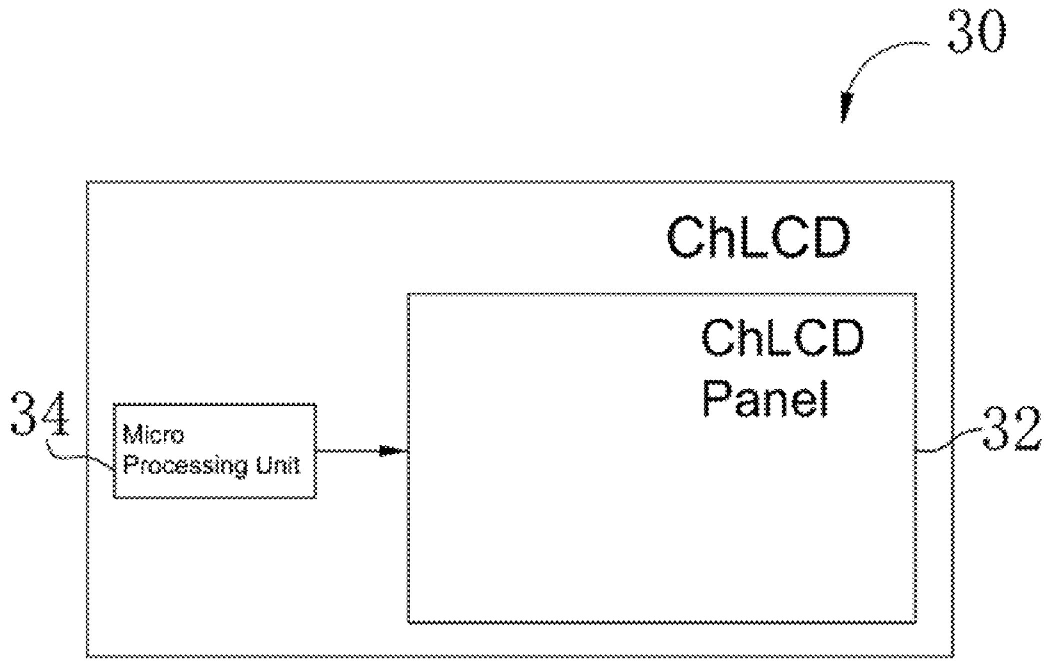
FIG. 3 is a schematic diagram of the functional elements of the hybrid-driven cholesteric liquid crystal display of the present invention.

The present invention provides a hybrid-driven Cholesteric Liquid Crystal Display (ChLCD), a micro processing unit, and a hybrid driving method, using a DDS driving mode and a PWM driving mode in hybrid way to display images on the ChLCD panel, thereby greatly improving the contrast and color gray scale. Referring to FIG. 3, it shows a schematic diagram of functional components of a hybrid-driven cholesteric liquid crystal display (ChLCD) 30 of the present invention. The present invention relates to a hybrid-driven ChLCD 30 for enhancing the color gray scale and contrast. The ChLCD 30 comprises a ChLCD panel 32 and a micro processing unit 34, which collaborate to achieve the desired performance.

The ChLCD panel 32 includes a plurality of display units (not shown in the FIGS.) that display an image together, and the image has a preset grayscale depth so that each display unit has a corresponding grayscale value, and a specific threshold grayscale value needs to be set within the range of the preset grayscale depth. The preset grayscale depth of the image is typically defined as a grayscale value ranging from 0 to 255 in the prior art. The higher the grayscale value is, the brighter the display image is, and when the grayscale value of the display image is 255, it is almost bright white color. The lower the grayscale value is, the darker the display image is, and when the grayscale value of the display image is zero, it is almost dark black. According to repeated tests conducted by the inventors, the threshold grayscale value is set to 16 that can produce an ideal display performance and the test results and exhibits will be presented in the figures as follows.

When it's about to drive the ChLCD panel 32 to display the image, the grayscale values that are displayed in the plurality of display units and exceed the threshold grayscale value are substituted with the grayscale values displayed to bright state colors by the micro processing unit 34. Next, the ChLCD panel 32 is driven in the DDS driving mode to display the image. The grayscale value of the bright state color can be 240 or higher, or the bright state color has a grayscale value of 240 or higher and can be displayed as a nearly bright white color with a grayscale value of 255.

The micro processing unit 34 drives the ChLCD panel 32 in PWM driving mode to set a specific grayscale value within the range of the preset grayscale depth. As mentioned above, firstly, the grayscale values exceeding the threshold grayscale value are substituted with the grayscale values of the bright state colors. The ChLCD panel 32 is then driven in the DDS driving mode, which is followed by the PWM driving mode to drive the ChLCD panel 32. It enhances color gray scale and contrast of the images. Additionally, the micro processing unit 34 can also be a timing controller (TCON).

Furthermore, as to the ChLCD 30, the display unit can display images in two modes: pure black, gray, and white display mode, and three primary colors of Red, Green, and Blue mode. The grayscale depth of the pure black, gray, and white display modes is the grayscale value in the range of pure grayscale 0 to 255. In the three primary colors of Red, Green, and Blue mode, the display unit can also show images with a corresponding grayscale depth of 0 to 255 for each of the three primary colors of R, G, and B respectively.

Figure 4A:
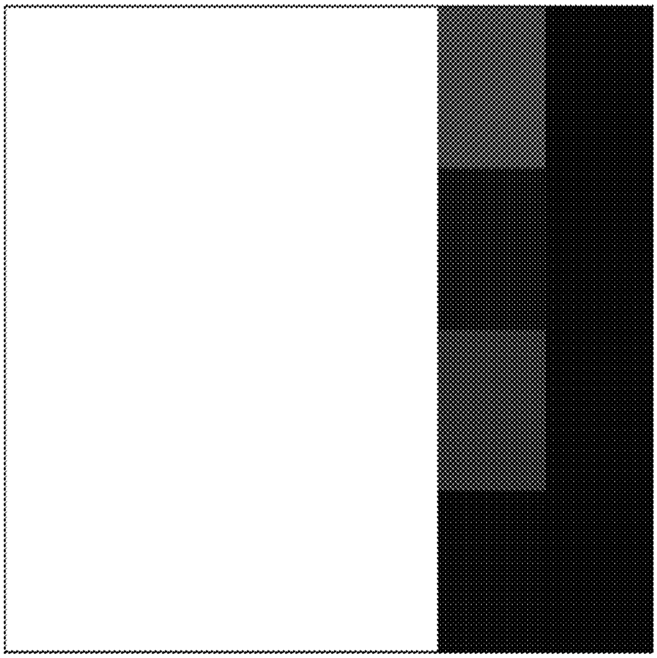
FIG. 4A is a schematic diagram of a display image using the DDS driving mode of the present invention.

FIG. 4A depicts a schematic diagram of a display image using the DDS driving mode of the present invention. As to aforementioned embodiment, the micro processing unit 34 first identifies the display units whose grayscale values are greater than the threshold grayscale value of 16. Then, it adjusts that display units to a bright state color with a grayscale value of 240 or higher. Alternatively, the micro processing unit 34 will directly adjust it to a bright state color with a grayscale value of 255. The middle and left half of the display image as shown in FIG. 4A are displayed in a bright state color with a grayscale value of 255, as their original grayscale value is higher than the threshold value of 16. On the other hand, the right half of the display image remains in its original grayscale value since original grayscale value of the right half of the display image is displayed in a grayscale value that is below the threshold value. As a result, the entire image appears as depicted in FIG. 4A.

Figure 1:
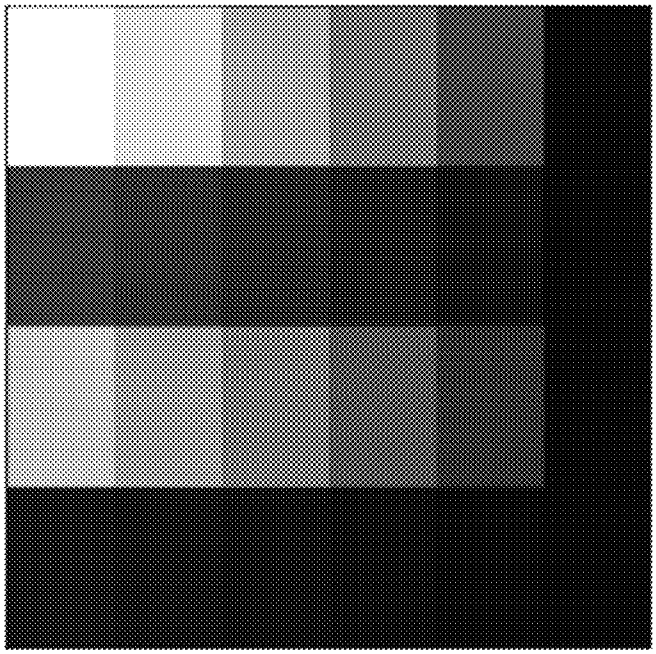
Fig. 1 (Prior Art)
FIG. 1 is a schematic diagram of a standard display image in the prior art.
Figure 2:
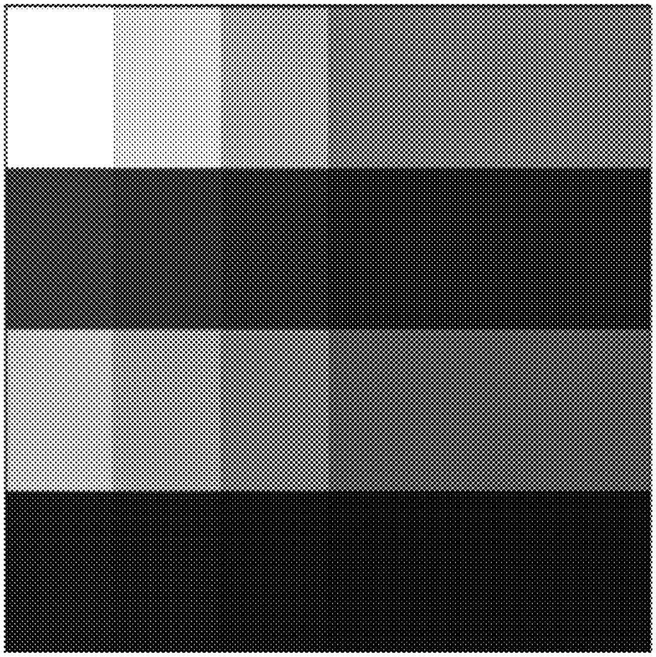
Fig. 2 (Prior Art)
FIG. 2 is a schematic diagram of a display image using the PWM driving mode in the prior art.
Figure 4B:
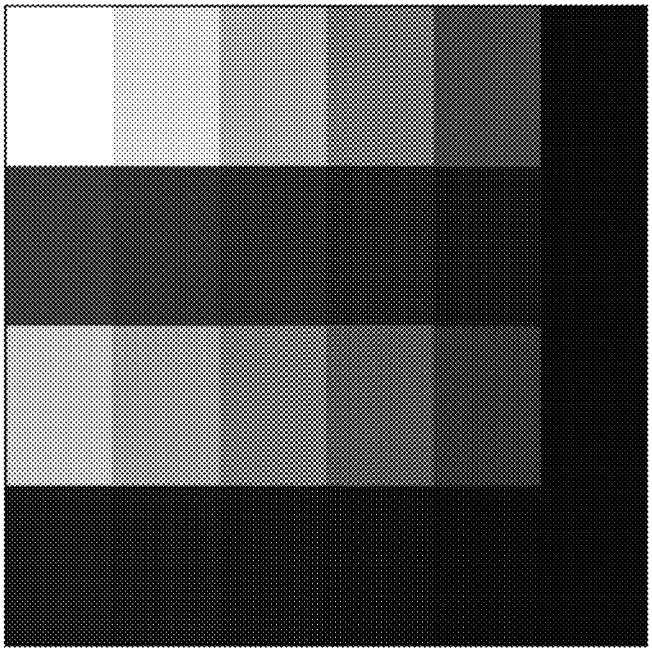
FIG. 4B is a schematic diagram of a display image of the present invention, using the DDS driving mode and then switching to PWM driving mode.

Next, please refer to FIG. 4B in conjunction with FIG. 4A. FIG. 4B illustrates a schematic diagram of the display image of the present invention, which utilizes the DDS driving mode and subsequently switches to the PWM driving mode. As to FIG. 4A, the micro processing unit 34 initially identifies the display units whose grayscale values are greater than the threshold grayscale value of 16, and adjusts that display unit to a bright state color with a grayscale value of 240 or higher. Furthermore, the ChLCD panel 32 is driven in the PWM driving mode to display image. The outcome of this process is shown in FIG. 4B, where not only is the color gradation of the displayed image more complete, but also the contrast of the displayed image is significantly enhanced, thereby avoiding the defects shown in FIG. 2.

Figure 5:
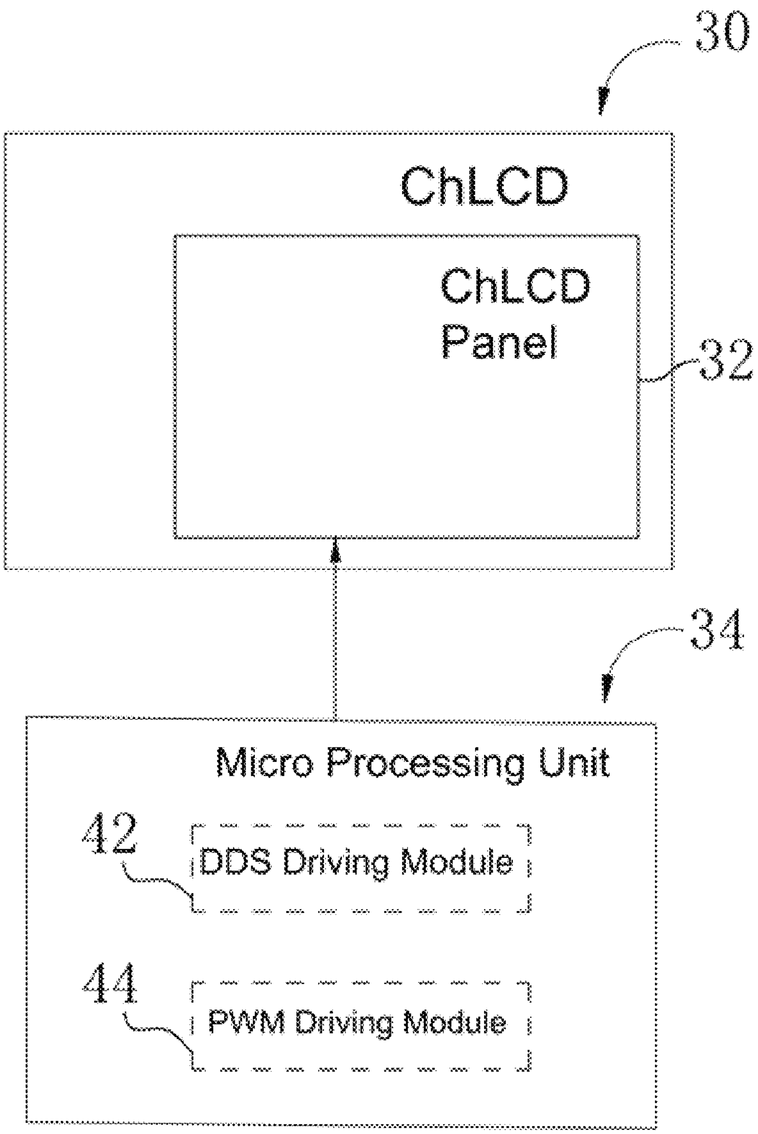
FIG. 5 is a schematic diagram of the functional elements of the micro processing unit for hybrid driving cholesteric liquid crystal display of the present invention.

Referring to FIG. 5, it presents a schematic diagram that depicts the functional modules of the micro processing module 34, which is part of the hybrid-driven cholesteric liquid crystal display. In addition to the hybrid-driven ChLCD 30, the present invention also provides a micro processing module 34, which is also used to enhance the color gray scale and contrast of images shown on the ChLCD panel 32 of the ChLCD 30, wherein the micro processing module 34 may use a timing controller, and the micro processing module 34 of this embodiment further comprises a DDS driving module 42 and a PWM driving module 44.

The image shown on the ChLCD panel 32 has the preset grayscale depth so that each display unit on the ChLCD panel 32 is assigned a grayscale value within a range of 0 to 255. The grayscale depth is typically defined as the range of the grayscale values from 0 to 255, with higher grayscale values indicating brighter displays and lower grayscale values indicating darker displays. A grayscale value of 255 corresponds to almost bright white, while a grayscale value of 0 corresponds to almost dark black.

Firstly, a specific threshold grayscale value needs to be assigned in the preset grayscale depth. The display units whose grayscale values are greater than the threshold grayscale value are identified in DDS driving mode, and are changed to the grayscale values of the bright state color. The ChLCD panel 32 is then driven in the DDS driving mode to display the image. According to repeated tests conducted by the inventors, the threshold grayscale value is set to 16, and the grayscale value of the bright state color can be 240 or higher, or alternatively, the grayscale value of the bright state color can be adjusted to a grayscale value of 255.

After the DDS drive module 42 adjusts the display unit whose grayscale value exceeds the threshold grayscale value to a bright state color, the PWM drive module 44 then drives the ChLCD panel 32 in the range of the preset grayscale depth in the PWM drive mode to display an image, that is, to display a specific grayscale value that is preset to be displayed within the range of 0 to 255 in the grayscale depth. In this way, the display unit whose greyscale value exceeds the threshold gray scale value is first adjusted to the bright state color, and then the display unit is driven by DDS driving mode and PWM driving mode in succession, which can greatly enhance the color gray scale and contrast of the display image.

As to the ChLCD 30 mentioned above, the display unit can display images in two modes: pure black, gray, and white display mode, and three primary colors of Red, Green, and Blue mode. The grayscale depth of the pure black, gray, and white display modes is the grayscale value in the range of grayscale 0 to 255. In the three primary colors of Red, Green, and Blue mode, the display unit can also show images with a corresponding grayscale depth of 0 to 255 for each of the three primary colors of R, G, and B respectively.

Figure 6:
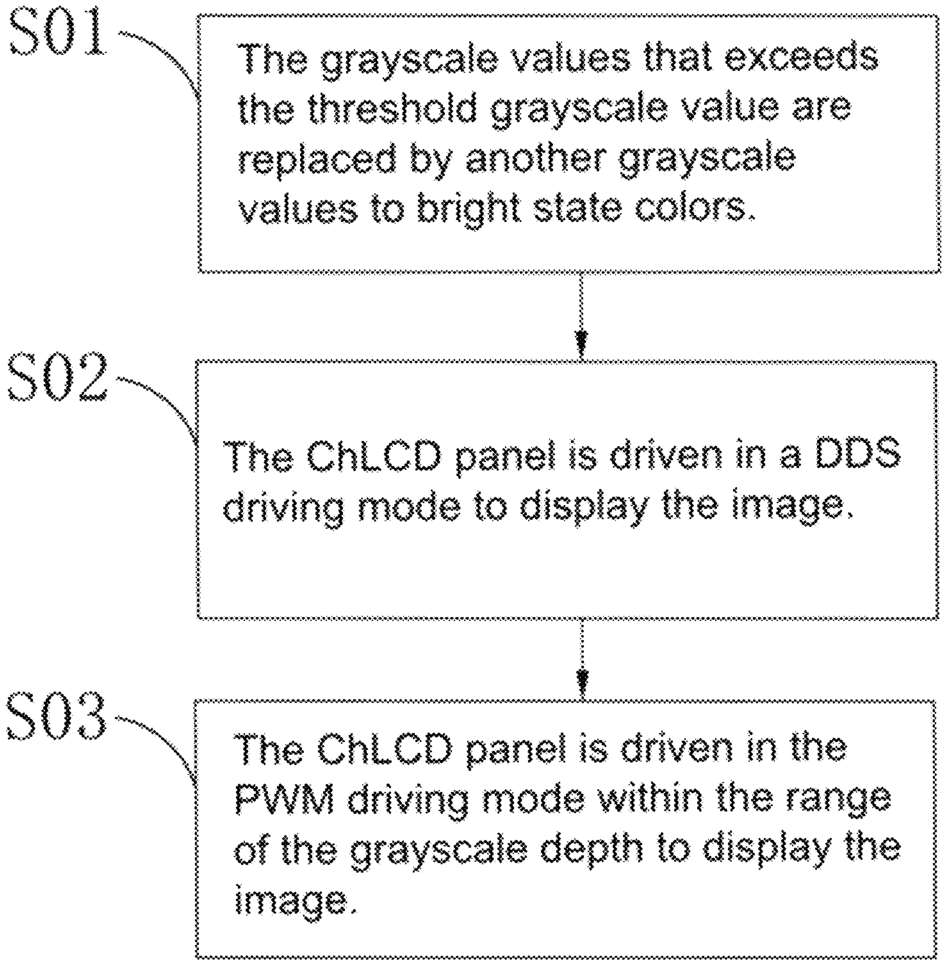
FIG. 6 is a flowchart of a hybrid driving method for a cholesteric liquid crystal display of the present invention.

Referring to FIG. 6, it illustrates a flow chart of the hybrid driving method of the present invention. In addition to the aforementioned hybrid-driven ChLCD 30 or the micro processing unit 34, the present invention also provides a hybrid driving method, which can make the ChLCD 30 improve the color gray scale and contrast of images shown on the ChLCD panel 32, or using the micro processing unit 34 to drive the ChLCD 30 to improve the color gray scale and contrast of the images on the ChLCD panel 32.

The images of the plurality of display units are assigned to preset greyscale depth so that each display unit has a corresponding greyscale value, and a threshold grayscale value is preset among the greyscale depth. The hybrid driving method of the present invention comprises the steps in the following:

In Step 01: among the grayscale values to be displayed in the images of the display units, the grayscale values exceeding the threshold grayscale value are substituted with the grayscale values of the bright state colors.

In Step S02: Next, the ChLCD panel 32 is driven in a DDS driving mode to display the images. As mentioned above, the micro processing unit 34 is used to drive the ChLCD panel 32. Generally, an image reset process is performed before the micro processing unit 34 is used to adjust the display units of the ChLCD panel 32 to the bright state color in the DDS driving mode, but it is not necessary to arrange the process steps of resetting the image in advance. The result of the displayed image is shown in FIG. 4A.

In Step 03: the ChLCD panel 32 is then driven in the PWM driving mode within the range of the preset grayscale depth to display the images. The result of the displayed image is shown in FIG. 4B.

The display unit whose grayscale value is greater than the threshold grayscale value is adjusted to the grayscale value of the bright state color. The DDS driving mode first sets the grayscale value of the bright state color, which is then followed by the PWM driving mode setting the grayscale value within the range of the preset grayscale depth. Thus, by using both the DDS and PWM driver modules to display images, it results in improved color gray scale and contrast of the images.

The present invention utilizes a driving method for the hybrid-driven ChLCD 30, which involves the micro processing unit 34 for driving the ChLCD 30. Additionally, the micro processing unit 34 is can also a timing controller (TCON).

As to the driving method mentioned above, the display unit can display images in two modes: pure black, gray, and white display mode, and three primary colors of Red, Green, and Blue mode. The grayscale depth of the pure black, gray, and white display modes is the grayscale value in the range of pure grayscale 0 to 255. In the three primary colors of Red, Green, and Blue mode, the display unit can also show images with a corresponding grayscale depth of 0 to 255 for each of the three primary colors of R, G, and B respectively.

The driving method employed in the embodiment assigns a grayscale value from 0 to 255 to the image displayed on the ChLCD panel 32. The preset grayscale depth is typically defined as the range of grayscale values from 0 to 255, where higher values represent brighter displays and lower values represent darker displays. A grayscale value of 255 indicates a bright white display, while a grayscale value of 0 indicates a dark black display. The inventors conducted repeated tests and set the threshold grayscale value to 16. The bright state color can have a grayscale value of 240 or higher, or it can be directly set to a grayscale value of 255.

Figure 7:
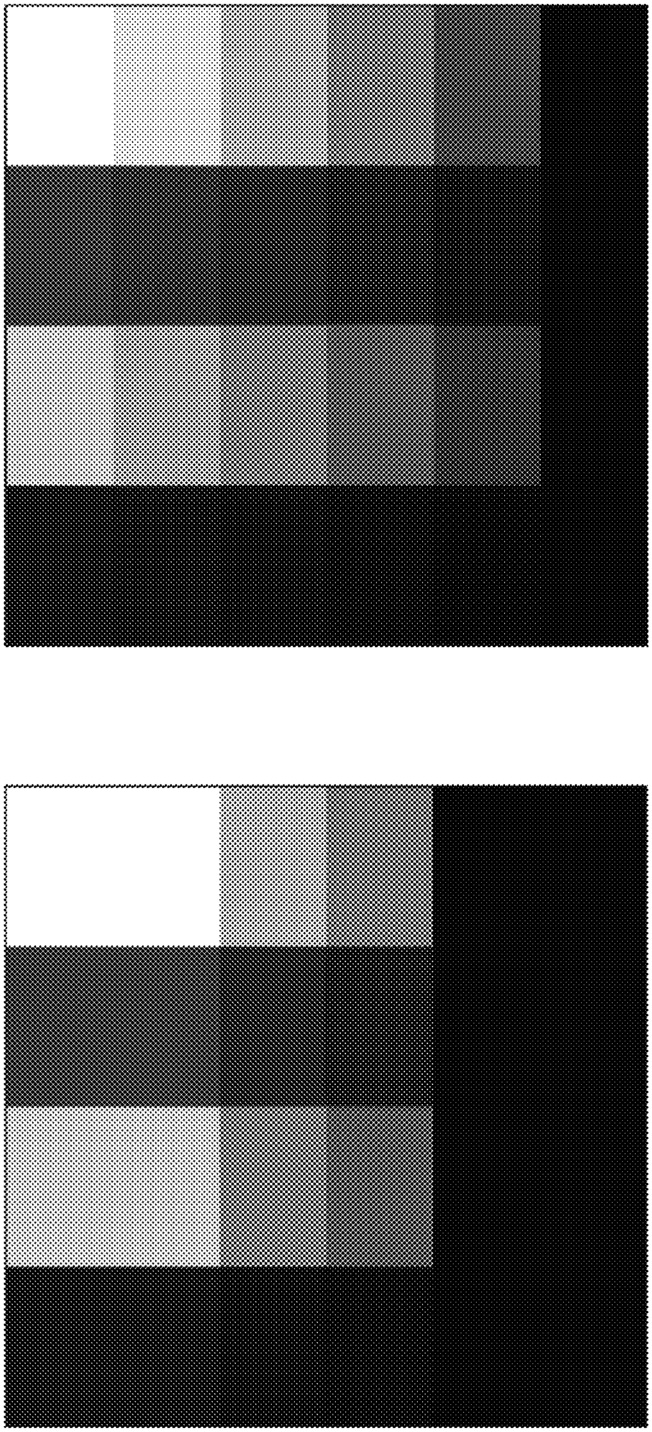
FIG. 7 is a schematic comparison diagram of a display image with a ratio of the driving times between DDS driving mode and PWM driving mode of the present invention.

FIG. 7 depicts a schematic comparison diagram of a display image with a ratio of the driving times between DDS driving mode and PWM driving mode of the present invention. As to above-mentioned the ChLCD 30, the micro processing unit 34, and the driving method, the preferred ratio of the driving time between DDS driving mode and PWM driving mode is 1:4, and the resulting display effect of the image is ideal at this ratio.

The upper half of the display image as shown in FIG. 7 indicates that the preferred ratio of the driving times between DDS driving mode and PWM driving mode is 1:4. Besides, bottom half of the display image as shown in FIG. 7 indicates that the preferred ratio of the driving times between DDS driving mode and PWM driving mode is 1:8. Thus, it is obvious that the upper half of the display image has better image quality than that of the bottom half, and the color gray scale and contrast of the upper half of the display image are much perfect as well.

To sum up, the present invention relates to a cholesteric liquid crystal display (ChLCD) 30, a micro processing unit 34, and a hybrid driving method. The present invention utilizes the micro processing unit 34 such as a timing controller to drive the ChLCD panel 32 and presets the threshold grayscale value. The ChLCD panel 32 is driven in the DDS driving mode and the PWM driving mode in sequence, and after the ChLCD panel 32 is driven in the DDS driving module, process for bright state color modification is executed to enhance the color gray scale and contrast of the images on the ChLCD panel 32.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A hybrid-driven cholesteric liquid crystal display (ChLCD), improving color gray scale and contrast, the ChLCD comprising:

a ChLCD panel, comprising a plurality of display units that collaborate to display an image, and the image having a preset grayscale depth so that each display unit corresponds to a specific grayscale value, and a threshold grayscale value is preset within a range of the preset grayscale depth; and a micro processing unit, substituting the specific grayscale values that are displayed on the display units and exceed the threshold grayscale value with another greyscale value of a bright state color before the specific grayscale values are displayed on the display units, and after the ChLCD panel is driven in a Dynamic Driving Scheme (DDS) driving mode to display the image, the micro processing unit driving the ChLCD panel to show the image based on the range of the preset grayscale depth in a Pulse Width Modulation (PWM) driving mode to enhance color gray scale and contrast of the image on the ChLCD panel.

2. The hybrid-driven cholesteric liquid crystal display (ChLCD), according to claim 1, wherein the display units show the image with a corresponding grayscale depth for each of three primary colors of Red, Green, and Blue respectively.

3. The hybrid-driven cholesteric liquid crystal display (ChLCD), according to claim 1, wherein the micro processing unit is a timing controller (TCON).

4. The hybrid-driven cholesteric liquid crystal display (ChLCD), according to claim 1, wherein the preset grayscale depth of the image is a grayscale value ranging from 0 to 255, the threshold grayscale value is set to 16, and the grayscale value of the bright state color is set to 240 or higher.

* * * * *